July 10, 1928.　　　　　　　　　　　　　　　　1,676,436
F. B. HAMLIN
FRONT WHEEL DRIVE FOR MOTOR VEHICLES
Filed Dec. 3, 1923
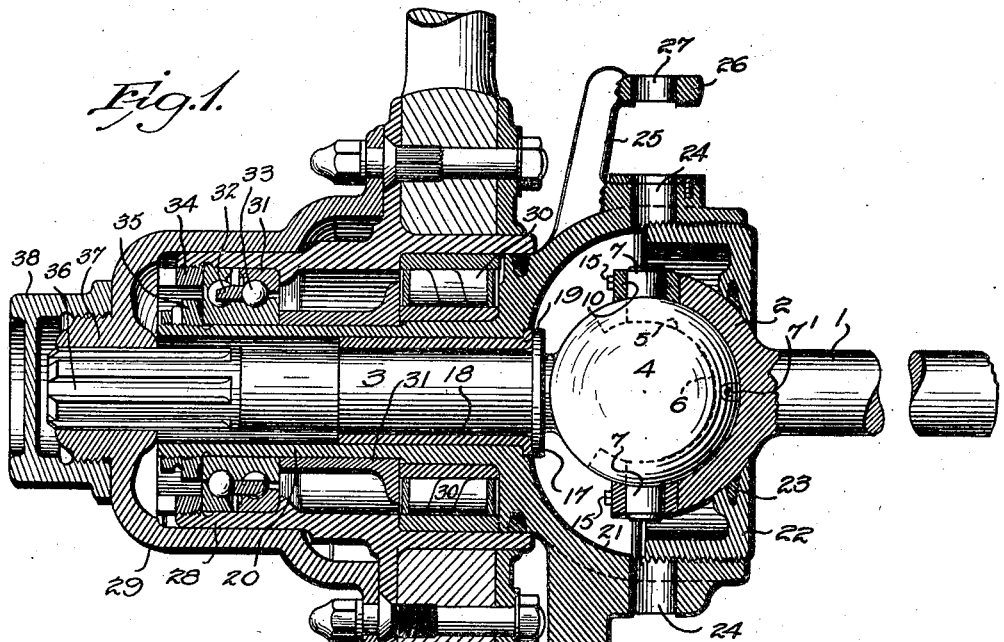
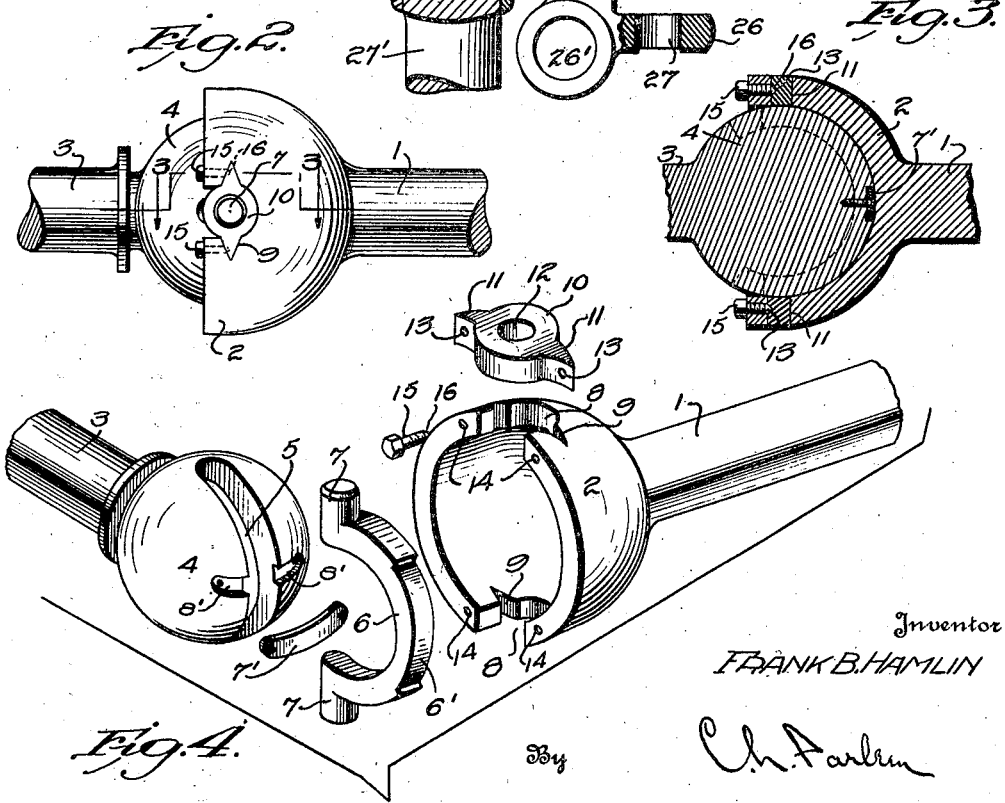
Inventor
FRANK B. HAMLIN
By
Attorney Patented July 10, 1928.

1,676,436

UNITED STATES PATENT OFFICE.

FRANK B. HAMLIN, OF EVANSTON, ILLINOIS.

FRONT-WHEEL DRIVE FOR MOTOR VEHICLES.

Application filed December 3, 1923. Serial No. 678,328.

This invention relates to front wheel drives for motor vehicles, and more particularly to a universal joint therefor.

An object of the invention is the provision of a universal joint comprising a ball, a socket to receive the ball, a key adapted to be received in a groove in the ball and having trunnions formed on its end to engage the socket, and bearing members carried by the socket to receive said trunnions.

A further object is the provision of a universal joint comprising a socket having irregular shaped recesses to receive soft metal bearing members shaped to fit said recesses.

A further object is the provision of a universal joint particularly adapted for use in a front wheel drive for motor vehicles.

In the accompanying drawings, I have shown one embodiment of the invention. In this showing:

Figure 1 is a central sectional view through a wheel hub showing the connection to the drive axle, Figure 2 is a plan view of the ball and socket joint, Figure 3 is a detail sectional view on line 3—3 of Figure 2, and, Figure 4 is a perspective view of the parts of the universal joint disassembled.

Referring to the drawings, the reference numeral 1 designates a driving axle adapted to be connected to a source of power, such as the internal combustion engine of a motor vehicle (not shown) through the provision of a differential of the ordinary construction (not shown). A socket member 2 is formed on the end of the drive axle, and this socket member, as shown, is substantially semi-spherical. The wheel is provided with a driven axle 3, having a ball 4 formed on its inner end. This ball is provided with a substantially semi-circular groove 5, adapted to receive a key 6. Trunnions 7 are formed on the ends of this key. It is the usual practice to provide openings in the ball member of a ball and socket joint to receive the trunnion 7. These ball members are generally formed of steel or other hard metal and the frequent turning of the driven member with respect to the axis of the drive member, such as is necessary when the universal joint is used in a front wheel drive of a motor vehicle, causes rapid wear on the trunnion 7. To overcome this, I provide recesses 8 in the edge or face of the socket member, these recesses being substantially circular and being provided with oppositely arranged extensions 9, which are substantially triangular. A bearing member 10, formed of bronze or other soft metal, is adapted to be arranged in each of these recesses. As shown, the bearing member consists of a circular body portion having triangular projections 11 arranged on opposite sides adapted to enter the extensions 9. The bearing members are provided with central openings 12 for the reception of the trunnion 7 (see Figure 1). The outer faces of the projections 11 are provided with recesses 13, and the socket member is provided with openings 14, arranged in alinement therewith. A suitable fastening element 15 is adapted to extend through each of the openings 14, and these fastening elements are provided with pointed ends 16, adapted to enter the depressions 13 (see Figure 3). While the illustrated form of bearing member 10 has been found efficient in operation, it will be apparent that I may employ other forms of bearing members with satisfactory results.

As will be understood, the shaft 1 is connected with the front end differential in the usual manner through the medium of a slip-joint (not shown) to compensate for changes in the relative vertical positions of the axle and chassis, whereby the shaft 1 may be lengthened or shortened. In order to eliminate any play between the key 6 and the ball 4, I have provided the former with an arcuate cut-away portion 6' in its outer face to slidably receive a band 7'. The band 7' is curved to conform to the outer surface of the ball 4 and has its ends mounted in slots 8' therein. The band 7' may be secured to the ball 4 by screws or other suitable fastening elements, and its outer face is flush with the surface of the ball.

In Figure 1 of the drawings, I have shown a universal joint applied to the front wheel of a motor vehicle to permit steering of the wheel and at the same time permit the application of power to the front wheel for driving. As shown, the drive member forming the axle of the wheel is provided with a collar 17, adjacent the ball, and a bushing 18 is arranged around the axle, forming a bearing. This bushing is provided with a flange 19 at its inner end, adapted to be arranged between the collar 17 and the inner end of the sleeve 20. The sleeve is provided with an extension 21, the inner face of which is shaped to fit around the ball and socket joint to form a chamber for the reception of a suitable lubricant. The inner end of this extension is internally screw-threaded and is adapted to receive a closure member 22, having a face adapted to surround the socket member 2. Suitable packing 23 may be arranged between the closure member 22 and the socket to prevent leakage of the lubricant. The upper and lower faces of the extension are provided with openings 24 and further provided with projecting arms 25. These arms are provided with angular portions 26, having openings 27 arranged in alinement with the openings 24 for the reception of the usual yoke by means of which the wheel is pivotally supported to permit steering. The lower arm 25 is provided with an opening 26' for the reception of a steering rod (not shown). The wheel of the vehicle is provided with the usual spokes 27', and a hub consisting of an inner member 28 and an outer member 29 is secured thereto. The inner member is spaced from the sleeve 20 and suitable roller bearings 30 may be arranged between the inner member and the sleeve. A spacing member 31 is arranged outwardly of these bearings, and bearing rings 32 and 33 are arranged adjacent the outer end of the spacing member. Suitable bearings 33 are arranged between these rings, which are retained in position by means of suitable locking members 34 and 35, engaging the inner member of the hub and the sleeve respectively. The outer end of the driven axle 3 is provided with a plurality of longitudinal grooves 36 adapted to receive keys 37, carried by the outer member of the hub to rigidly connect the driven axle to the wheel. A suitable hub cap 38 may be arranged over the end of the axle.

The operation of the device will be apparent from the foregoing description. The vehicle is steered in the usual manner and the front wheels are driven from the drive axle 1 through the driven axle, thence through the outer member of the hub to the wheels. The provision of the ball and socket joint permits the wheel to be turned in a vertical plane for steering purposes without interfering with the drive mechanism.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. A universal joint comprising a drive member, a driven member, a ball formed on the end of one of said members, a socket formed on the end of the other member, said ball being provided with an arcuate groove, an arcuate key mounted in said groove, trunnions formed on the end of said key, said socket being provided with diametrically opposite similarly shaped recesses formed in its edge, said recesses being widest at points remote from the edge of the socket and bearing members shaped to fit said recesses and mounted therein, said bearing members being adapted to receive said trunnions.

2. A universal joint comprising a drive member, a driven member, a ball formed on the end of one of said members, a socket formed on the end of the other member, said ball being provided with an arcuate groove, an arcuate key mounted in said groove and provided with diametrically opposite trunnions formed at its ends, said socket being provided in its edge with substantially circular recesses each having opposite notches extending in a line substantially parallel to and spaced from the edge of the socket, and a substantially circular bearing member arranged in each of said recesses, each of said bearing members being provided with projections adapted to be received in said notches and being further provided with openings for the reception of said trunnions.

3. A device constructed in accordance with claim 2 wherein said socket is provided in its edge on opposite sides of said recesses with threaded openings, and fastening elements threaded within said threaded openings and engaging the projections of said bearing members.

4. A universal joint comprising a drive member, a ball formed on the end of one of said members, and provided with a groove, a socket formed on the end of the other member, a key mounted in said groove and provided at its ends with diametrically opposite radial trunnions, bearing members carried by said socket and adapted to receive said trunnions, said key being provided in its outer edge with an arcuate cut out portion, and a plate secured to said ball and extending across the groove therein, the outer face of said plate being flush with the surface of said ball and adapted to engage within the cut out portion of said key.

In testimony whereof, I affix my signature.

FRANK B. HAMLIN.